No. 681,320. Patented Aug. 27, 1901.
H. Q. HOOD.
MEASURING FAUCET.
(Application filed May 14, 1901.)
(No Model.)
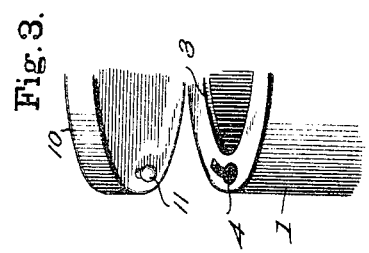
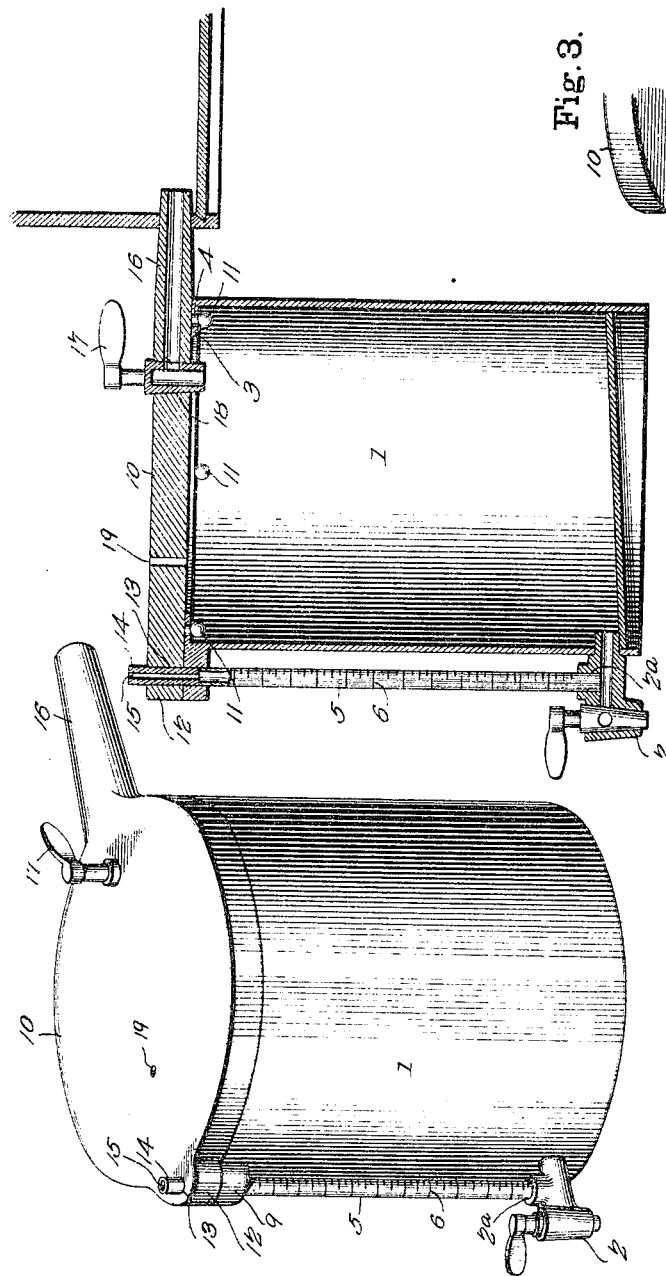
Witnesses
H. Q. HOOD, Inventor
by
Attorneys United States Patent Office.

HIRAM Q. HOOD, OF CARTHAGE, MISSOURI.

MEASURING-FAUCET.

SPECIFICATION forming part of Letters Patent No. 681,320, dated August 27, 1901.

Application filed May 14, 1901. Serial No. 60,170. (No model.)

*To all whom it may concern:*

Be it known that I, HIRAM Q. HOOD, a citizen of the United States, residing at Carthage, in the county of Jasper and State of Missouri, have invented a new and useful Measuring-Faucet, of which the following is a specification.

My invention is an improved measuring-faucet for measuring liquids as the same are drawn from a cask or the like; and it consists in the peculiar construction and combination of devices hereinafter set forth and claimed.

In the accompanying drawings, Figure 1 is a perspective view of a measuring-faucet constructed in accordance with my invention. Fig. 2 is a sectional view of the same. Fig. 3 is a detail perspective view of the measuring vessel and its cover, showing the means for securing the latter on the measuring vessel.

In the embodiment of my invention I provide a measuring vessel 1, which has a faucet 2 on one side to draw off the contents thereof. The measuring vessel is provided at its upper side with an inturned flange 3, which is provided at suitable distances apart with keyhole-slots 4. On one side of the measuring vessel 1 is a gage-tube 5, which is made of glass and is provided with a graduated scale 6, representing units of liquid measure. The lower end of the gage 6 is connected to the faucet 2, the latter having a socket 2ª for the gage. The upper end of the gage is disposed in an opening 8 in a lug or ear 9, that projects from one side of the measuring vessel.

The cover 10 of the measuring vessel is provided on its under side with headed pins 11, which by engagement with the keyhole-slots 4 in the flange 3 of the measuring vessel detachably secure the cover thereto. It will be understood that in attaching the cover to the measuring vessel the cover is partly rotated with reference to the measuring vessel in order to cause the shanks of the pins 11 to enter the narrowed portions of the keyhole-slots. The cover is provided on one side with a projecting ear or lug 12, having an opening 13, which registers with the opening 8 of lug or ear 9 when the cover is attached to the measuring vessel, and the plug 14 is fitted in said registering openings 8 13 and serves to lock the cover on the measuring vessel and prevent it from being turned to disengage the headed pins from the keyhole-slots, as will be understood. This plug 14 is bored longitudinally, as at 15, and provides a vent at the upper end of the gage-tube. Hence the said plug is efficient both as a locking device in securing the cover on the measuring vessel and as a vent for the gage-tube. The cover 10 is provided at one side with a tubular portion 16, which is adapted to be driven into an opening in a cask in order to attach the measuring-faucet thereto. At the inner end of the bore of the tubular portion 16 is a faucet-plug 17, which may be of the form here shown or of any other suitable form and is adapted to turn in a seat 18, with which the cover is provided. The cover is further provided with a vent 19.

The operation of my invention is as follows: The faucet 2 being closed the faucet-plug 17 is turned to open the tubular connection between the vessel 1 and the cask and liquid is drawn from the cask into the vessel 1. When the desired quantity indicated on the scaled gage 5 has been drawn into the vessel 1, the plug 17 is turned to cut off the flow of liquid from the cask to the measuring vessel and the contents of the latter are drawn therefrom by the faucet 2. The gage being connected to the faucet and vented at its upper end will be entirely drained by the faucet, when the liquid is drawn from the vessel 1, as will be understood.

Having thus described my invention, I claim—

1. The combination of a measuring vessel having a draw-off faucet and a gage-tube connected to said faucet to be drained thereby, said vessel having an ear 9 provided with an opening in which the upper end of the gage-tube is secured, a detachable cover on said vessel, said cover having a faucet, and provided with an opening to register with that in the said ear, and a locking-plug in said registering openings, substantially as described.

2. The combination of the measuring vessel having the draw-off faucet and the gage-tube, the measuring vessel having the ear 9 provided with an opening in which the upper end of the gage-tube is disposed, the detachable cover, said cover and said measuring vessel having a slidable connection and said cover having an opening to register with that in which the gage-tube is disposed, a locking-plug in said opening, the said cover being further provided with a tubular portion adapted to be fitted in a hole in a cask and provided with a faucet-plug, substantially as described.

In testimony that I claim the foregoing as my own I have hereto affixed my signature in the presence of two witnesses.

HIRAM Q. HOOD.

Witnesses:
 J. P. NEWELL,
 MYRTLE L. DOME.